US010895216B2

(12) United States Patent
Suda et al.

(10) Patent No.: US 10,895,216 B2
(45) Date of Patent: Jan. 19, 2021

(54) CONTROL DEVICE OF INTERNAL COMBUSTION ENGINE

(71) Applicants: TOYOTA JIDOSHA KABUSHIKI KAISHA, Toyota (JP); DENSO CORPORATION, Kariya (JP)

(72) Inventors: Toru Suda, Toyota (JP); Rintarou Tachibana, Toyota (JP); Tetsuji Nagata, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 15/736,618

(22) PCT Filed: Oct. 17, 2016

(86) PCT No.: PCT/JP2016/080726

§ 371 (c)(1),
(2) Date: Dec. 14, 2017

(87) PCT Pub. No.: WO2017/077849

PCT Pub. Date: May 11, 2017

(65) Prior Publication Data

US 2018/0171927 A1 Jun. 21, 2018

(30) Foreign Application Priority Data

Nov. 5, 2015 (JP) ................................ 2015-217994

(51) Int. Cl.
*B60T 7/12* (2006.01)
*F02D 41/30* (2006.01)
(Continued)

(52) U.S. Cl.
CPC ......... *F02D 41/3082* (2013.01); *F02D 41/04* (2013.01); *F02D 41/3094* (2013.01);
(Continued)

(58) Field of Classification Search
CPC ................. F02D 41/04; F02D 41/3094; F02D 2200/0602; F02D 2200/10; F02D 41/3082
(Continued)

(56) References Cited

U.S. PATENT DOCUMENTS 5,699,772 A * 12/1997 Yonekawa .......... F02D 41/3082 123/497
9,617,960 B2 * 4/2017 Saito .................. F02D 41/3854
(Continued)

FOREIGN PATENT DOCUMENTS

CN 101182816 A 5/2008
JP H08-100695 A 4/1996
(Continued)

*Primary Examiner* — Hung Q Nguyen
*Assistant Examiner* — Anthony Donald Taylor, Jr.
(74) *Attorney, Agent, or Firm* — Oliff PLC

(57) ABSTRACT

A controller of a control device of an internal combustion engine includes: a storage configured to store fuel pressure detected during injection of one port injection valve of port injection valves in association with another port injection valve, of the port injection valves, scheduled to inject fuel after one or two cycles of the fuel pressure pulsation elapsing from injection of the one port injection valve; and a calculator configured to calculate an energization period of the another port injection valve based on the stored fuel pressure.

12 Claims, 14 Drawing Sheets

(51) Int. Cl.
*F02D 41/04* (2006.01)
*F02D 41/38* (2006.01)

(52) U.S. Cl.
CPC ................ *F02D 2041/3881* (2013.01); *F02D 2200/0602* (2013.01); *F02D 2200/10* (2013.01); *F02D 2250/04* (2013.01)

(58) Field of Classification Search
USPC .......................................... 701/103, 104, 105
See application file for complete search history.

(56) References Cited

U.S. PATENT DOCUMENTS

| | | | | |
|---|---|---|---|---|
| 2005/0098155 | A1* | 5/2005 | Yamazaki | F02D 41/3094 123/431 |
| 2005/0241617 | A1* | 11/2005 | Kojima | F02D 41/3094 123/446 |
| 2008/0281500 | A1* | 11/2008 | Nakata | F02D 41/3809 701/103 |
| 2012/0260891 | A1* | 10/2012 | Love | F02M 63/0001 123/495 |

FOREIGN PATENT DOCUMENTS

| | | | | |
|---|---|---|---|---|
| JP | 2001-27164 | A | 1/2001 | |
| JP | 2001-336436 | A | 12/2001 | |
| JP | 2001336436 | * | 12/2001 | F02D 41/04 |
| JP | 2005-146882 | A | 6/2005 | |
| JP | 2005-315174 | A | 11/2005 | |
| JP | 2006-161627 | A | 6/2006 | |
| JP | 2007-107471 | A | 4/2007 | |
| JP | 2008-190508 | A | 8/2008 | |
| JP | 2012-193626 | A | 10/2012 | |
| JP | 2012193626 | * | 10/2012 | F02D 41/04 |
| JP | 2012-237274 | A | 12/2012 | |
| JP | 2012237274 | * | 12/2012 | F02D 41/3094 |
| JP | 2014-190186 | A | 10/2014 | |

* cited by examiner

CONTROL DEVICE OF INTERNAL COMBUSTION ENGINE

TECHNICAL FIELD

The present invention relates to a control device of an internal combustion engine.

BACKGROUND ART

There is known a multi-cylinder-type internal combustion engine equipped with cylinder injection valves and port injection valves. As for such an internal combustion engine, fuel drawn up by a feed pump is supplied to the port injection valves through a low pressure fuel passage. Then, the fuel further pressurized by a high pressure pump is supplied to the cylinder injection valves through a high pressure fuel passage branched off from the low pressure fuel passage. Desirably, the fuel injection quantity of such a fuel injection valve is injected only by the required injection quantity required according to the driving state of the internal combustion engine. As for the control of the fuel injection quantity of the port injection valve, for example, an energization period of the port injection valve corresponding to the required injection quantity is calculated based on a fuel pressure value detected by a fuel pressure sensor, and the port injection valve is energized only for the calculated energization period.

Here, fuel pressure pulsation may occur in the low pressure fuel passage due to driving of the high pressure pump. The fuel pressure pulsation makes the fuel pressure unstable. This may not accurately control the fuel injection quantity of the port injection valve. Thus, an air-fuel ratio may not be controlled accurately.

On the other hand, patent document 1 describes a technique to suitably control a fuel injection quantity corresponding to the fuel pressure pulsation on the basis of a predetermined map defining a correction value for the required injection quantity of the port injection valve, when the fuel pressure pulsation occurs.

PRIOR ART DOCUMENT

Patent Document

[Patent Document 1] Japanese Unexamined Patent Application Publication No. 2012-237274

SUMMARY OF THE INVENTION

Problems to be Solved by the Invention

However, the map described in patent document 1 defines a correction value of the required injection quantity depending only on the rotational speed of the internal combustion engine. Herein, it is considered that the fuel pressure during the fuel pressure pulsation is influenced by driving condition such as load and temperature of the internal combustion engine and characteristics of used fuel. Therefore, the fuel injection quantity might not be accurately controlled according to the fuel pressure pulsation, even if the required injection quantity is corrected based only on the rotational speed of the internal combustion engine.

Also, to control the fuel injection quantity of the port injection valve during the fuel pressure pulsation, the method is considered as follows. For example, fuel pressure is detected during injection of the port injection valve. An energization period corresponding to the required injection quantity is then calculated based on this fuel pressure during injection. Next, the port injection valve is controlled to be energized only for a calculated energization period. Fuel injection period is however short.

It might be therefore difficult to execute the above process for such a short period.

Moreover, it is considered to control the fuel injection quantity of the port injection valve on the basis a smoothing value of the fuel pressure calculated from detected fuel pressure values. It is however difficult to reflect the component of the fuel pressure pulsation to a smoothing value. Therefore, the fuel injection quantity of the port injection valve may not be accurately controlled.

An object of the present invention is to provide a control device of an internal combustion engine which can accurately control the fuel injection quantity of the port injection valve.

Means for Solving the Problems

The above object is achieved by a control device of an internal combustion engine including: cylinder injection valves that respectively inject fuel into cylinders of the internal combustion engine; port injection valves that respectively inject fuel toward intake ports of the internal combustion engine; a feed pump that pressurizes fuel; a low pressure fuel passage that supplies fuel pressurized by the feed pump to the port injection valves; a high pressure pump that further pressurizes fuel supplied from the low pressure fuel passage; a high pressure fuel passage that branches off from the low pressure fuel passage and supplies fuel pressurized by the high pressure pump to the cylinder injection valves; a fuel pressure sensor that detects fuel pressure in the low pressure fuel passage; a crank angle sensor that detects a rotational angle of a crankshaft of the internal combustion engine; and a controller configured to calculate each energization period of the port injection valves corresponding to required injection quantity and to energize the port injection valves in an order at a predetermined crank angle interval only for the calculated energization period, wherein the high pressure pump is driven in conjunction with the crankshaft and generates fuel pressure pulsation in the low pressure fuel passage, and the controller configured to include: a storage configured to store fuel pressure detected during injection of one port injection valve of the port injection valves in association with another port injection valve, of the port injection valves, scheduled to inject fuel after one or two cycles of the fuel pressure pulsation elapsing from injection of the one port injection valve; and a calculator configured to calculate an energization period of the another port injection valve based on the stored fuel pressure.

Since the fuel pressure pulsation periodically changes, the fuel pressure detected during the injection of one port injection valve is considered to be substantially the same as the fuel pressure during the another port injection valve scheduled to inject fuel after one or two cycles of the fuel pressure pulsation elapsing from the injection of the one port injection valve. On the basis of this fuel pressure, the energization period of the another port injection valve is calculated. Since the energization period of the port injection valve is calculated on the basis of the fuel pressure actually detected in this manner, the fuel injection quantity of the other port injection valve can be accurately controlled even when the fuel pressure pulsation occurs.

Further, the energization period of the other port injection valve may be calculated after the fuel pressure during the injection of the one port injection valve is detected before the fuel pressure during the injection of the another port injection valve is detected. It is therefore possible to ensure the time required for calculating the energization period of the other port injection valve.

The fuel pressure sensor may detect fuel pressure at a time interval shorter than a minimum energization period of each port injection valve.

An average value calculator configured to calculate an average value of detected fuel pressures when there are the fuel pressures detected during the injection of the one port injection valve may be further included, wherein the storage may be configured to store the average value of the fuel pressure, and the calculator may be configured to calculate the energization period of the another port injection valve based on the average value of the fuel pressure.

The controller may be configured to include a determinator configured to determine whether or not the fuel pressure pulsation greatly influences calculation of each energization period of the port injection valves on a basis of rotational speed of the crankshaft, the storage may be configured to store the fuel pressure detected during the injection of the one port injection valve in association with the another port injection valve, when it is determined that the fuel pressure pulsation greatly influences calculation of each energization period of the port injection valves, and the calculator may be configured to calculate an energization period of the another port injection valve based on the stored fuel pressure, when it is determined that the fuel pressure pulsation greatly influences calculation of each energization period of the port injection valves.

The controller may be configured to control the fuel pressure in the low pressure passage by controlling the feed pump according to the driving state of the internal combustion engine, and the calculator may be configured to calculate an energization period of the another port injection valve based on the fuel pressure immediately before the energization period of the another port injection valve is calculated, when it is not determined that the fuel pressure pulsation greatly influences calculation of each energization period of the port injection valve.

Effects of the Invention

According to the present invention, there is provided to a control device of an internal combustion engine which can accurately control fuel injection quantity of a port injection valve.

MODES FOR CARRYING OUT THE INVENTION

Hereinafter, preferred embodiments of the present invention will be described in detail with reference to the accompanying drawings.

Figure 1:
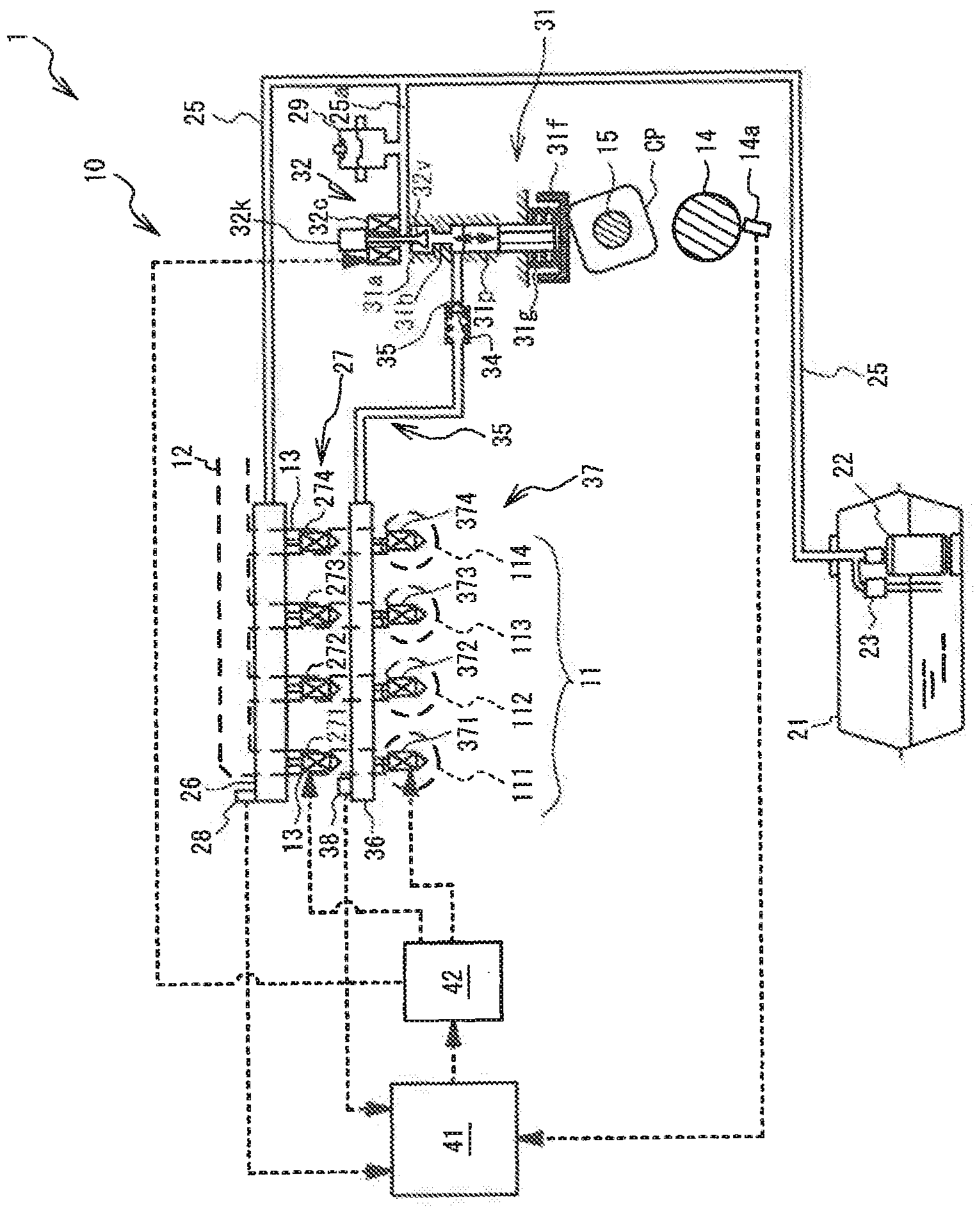
FIG. 1 is a schematic configuration view of a control device of an internal combustion engine in the present embodiment.

FIG. 1 is a schematic configuration view of a control device 1 of an internal combustion engine (hereinafter, referred to as control device) in the present embodiment. The control device 1 includes an engine 10 and an ECU (Engine Control Unit) 41 controlling the engine 10. The engine 10 is a spark ignition type in-line four-cylinder engine including cylinders 11 including cylinders 111 to 114 arranged in series, cylinder injection valves 37, and port injection valves 27. The cylinder injection valves 37 include cylinder injection valves 371 to 374 respectively injecting fuel into the cylinders 111 to 114. The port injection valves 27 include port injection valves 271 to 274 respectively injecting fuel toward intake ports 13 communicated with the cylinders 111 to 114. Each of the cylinder injection valves 37 and the port injection valves 27 is an electromagnetically driven open/close valve, in which energization of an electromagnetic coil for a predetermined energization period causes a valve element to separate away from a valve seat, which adjusts fuel injection quantity.

The engine 10 is formed with an intake passage 12 having the intake ports 13 corresponding to each cylinder 11 and an exhaust passage having exhaust ports (not illustrated). A non-illustrated piston is housed, and a combustion chamber is defined in each cylinder 11. The combustion chamber is opened and closed by an intake valve and an exhaust valve. Furthermore, the engine 10 is equipped with spark plugs not illustrated. Also, the engine 10 is equipped with: a crankshaft 14 interlocked with pistons; and camshafts 15 interlocked with the crankshaft 14 and driving the intake valves or the exhaust valves. Also, a crank angle sensor 14*a* detecting a rotational angle of the crankshaft 14 is provided.

Also, the control device 1 includes a fuel tank 21, a feed pump 22, a pressure regulator 23, a low pressure fuel pipe 25, a low pressure delivery pipe 26, and a fuel pressure sensor 28.

The fuel tank 21 stores gasoline as fuel. The feed pump 22 pressurizes and discharges fuel into the low pressure fuel pipe 25. The pressure regulator 23 adjusts fuel to be injected into the low pressure fuel pipe 25 to the supply pressure of the low pressure side set beforehand.

The low pressure fuel pipe 25 and the low pressure delivery pipe 26 are an example of the low pressure fuel passage supplying fuel injected from the feed pump 22 to the port injection valves 27. The fuel is pressurized to a predetermined pressure level by the feed pump 22, is adjusted by the pressure regulator 23 to the supply pressure of the low pressure side, and is introduced into the low pressure delivery pipe 26 through the low pressure fuel pipe 25.

The port injection valves 27 is connected to the low pressure delivery pipe 26, and injects fuel into the intake ports 13 respectively corresponding to the cylinders 11. The fuel pressure sensor 28, described below in detail, detects fuel pressure in the low pressure delivery pipe 26 and outputs to the ECU 41.

Also, the control device 1 includes a high pressure pump 31, a high pressure fuel pipe 35, a high pressure delivery pipe 36, and a fuel pressure sensor 38.

The high pressure pump 31 draws fuel from a branch pipe 25*a* which branches off from the low pressure fuel pipe 25, and pressurizes the fuel to a high pressure level higher than a supply pressure level from the feed pump 22. The branch pipe 25*a* is provided with a pulsation damper 29 that suppresses the fuel pressure pulsation within the branch pipe 25*a*.

Specifically, the high pressure pump 31 includes a pump housing 31*h*, a plunger 31*p* slidable in the pump housing 31*h*, and a pressurizing chamber 31*a* defined between the pump housing 31*h* and the plunger 31*p*. The volume of the pressurizing chamber 31*a* changes depending on the displacement of the plunger 31*p*. The fuel pressurized by the feed pump 22 is introduced into the pressurizing chamber 31*a* through the branch pipe 25*a* while an electromagnetic valve 32 to be described later is opened. The fuel in the pressurizing chamber 31*a* is highly pressurized by the plunger 31*p* and is discharged into the high pressure fuel pipe 35.

The camshaft 15 of the engine 10 is equipped with a cam CP for driving the plunger 31*p*. The cam CP has a square shape with round corners. Also, the high pressure pump 31 includes a follower lifter 31*f* lifted up and down by the cam CP and a spring 31*g* urging the follower lifter 31*f* to the cam CP. The plunger 31*p* is interlocked with the follower lifter 31*f*, and is lifted up and down together with the follower lifter 31*f*. The camshaft 15 and the cam CP are rotated at one half of the rotational speed of the crankshaft 14.

An electromagnetic valve 32 is provided at the fuel introduction port portion of the pressurizing chamber 31*a* of the high pressure pump 31. The electromagnetic valve 32 includes a valve body 32*v*, a coil 32*c* for driving the valve body 32*v*, and a spring 32*k* for always urging the valve body 32*v* in the opening direction. the ECU 41 controls the energization of the coil 32*c* via a driver circuit 42. When the coil 32*c* is energized, the valve body 32*v* blocks the branch pipe 25*a* of the low pressure fuel pipe 25 from the pressurizing chamber 31*a* against the urging force of the spring 32*k*. When the coil 32*c* is not energized, the valve body 32*v* is maintained in the opened state according to the urging force of the spring 32*k*.

A check valve 34 with a spring is provided on the high pressure fuel pipe 35 between the high pressure pump 31 and the cylinder injection valves 37. The check valve 34 opens when the fuel pressure in the high pressure pump 31 is higher than the fuel pressure in the high pressure fuel pipe 35 by a predetermined level.

In the intake stroke of the high pressure pump 31, the electromagnetic valve 32 opens and the plunger 31*p* moves down so that the fuel is charged into the pressurizing chamber 31*a* from the branch pipe 25*a* of the low pressure fuel pipe 25. In the pressurization stroke, the electromagnetic valve 32 closes, and the volume of the pressurizing chamber 31*a* decreases with the rise of the plunger 31*p* to pressurize fuel in the pressurizing chamber 31*a*. In the discharge stroke, when the force acting on the check valve 34 due to the fuel pressure in the pressurizing chamber 31*a* is greater than the urging force of the spring of the check valve 34, the check valve 34 opens, which supplies the pressurized fuel to the high pressure fuel pipe 35 and the high pressure delivery pipe 36. As described above, the lifting up and down of the plunger 31*p* is achieved by the rotation of the cam CP. The cam CP is interlocked with the crankshaft 14 via the camshaft 15. Therefore, the high pressure pump 31 is driven in conjunction with the crankshaft 14.

Note that, the electromagnetic valve 32 opens in the non-energization state, but the present invention is not limited thereto. For example, the coil 32*c* and the urging direction of the spring 32*k* may be changed such that the electromagnetic valve 32 closes in the non-energization state. In this case, the coil 32*c* is energized in the intake stroke of fuel, and the coil 32*c* is not energized in the pressurization and discharge strokes.

The high pressure fuel pressurized by the high pressure pump 31 is accumulated in the high pressure delivery pipe 36 through the high pressure fuel pipe 35. The high pressure fuel pipe 35 and the high pressure delivery pipe 36 are an example of a high pressure fuel passage that supplies high pressure fuel from the high pressure pump 31 to the cylinder injection valves 371 to 374.

The cylinder injection valves 37 directly inject the high pressure fuel from the high pressure delivery pipe 36 into each cylinders 111 to 114 in a predetermined order. The fuel pressure sensor 38 detects the fuel pressure in the high pressure delivery pipe 36 and outputs it to the ECU 41.

The ECU 41 includes a CPU (Central Processing Unit), a ROM (Read Only Memory), and a RAM (Random Access Memory). The ECU 41 calculates the required injection quantity of fuel according to the driving state of the engine 10 and the acceleration request on the basis of the information from the sensors and the information stored beforehand in the ROM according to the control program stored beforehand in the ROM. Also, the ECU 41 calculates each energization period of the port injection valves 27 corresponding to the required injection quantity and executes energization injection for the calculated energization period in order from the port injection valves 27 at a predetermined crank angle interval. Also, as will be described in detail later, the ECU 41 controls the fuel injection quantity from the port injection valves 27 when the fuel pressure pulsation increases. This control is executed based on a determinator, a storage, a calculator, and an average value calculator, which are functionally achieved by the CPU, the ROM, and the RAM.

The ECU 41 controls the port injection valves 27 and the cylinder injection valves 37 so as to each inject fuel only by the required injection quantity. Here, the fuel injection quantity of each of these fuel injection valves is proportional to the valve opening period. The valve opening period is proportional to the energization period of the electromagnetic coil of the fuel injection valve. Therefore, the ECU 41 calculates each energization period of the port injection valves 27 according to the required injection quantity on the basis of the detected value of the fuel pressure sensor 28. Likewise, the ECU 41 calculates each energization period of the cylinder injection valves 37 according to the required injection quantity on the basis of the detected value of the fuel pressure sensor 38. The ECU 41 instructs the driver circuit 42 according to the calculated energization period. In accordance with the instruction from the ECU 41, the driver circuit 42 energizes each of the port injection valves 27 and the cylinder injection valves 37 only for the calculated energization period. In this way, the fuel injection quantity of each fuel injection valve is controlled.

Figure 2:
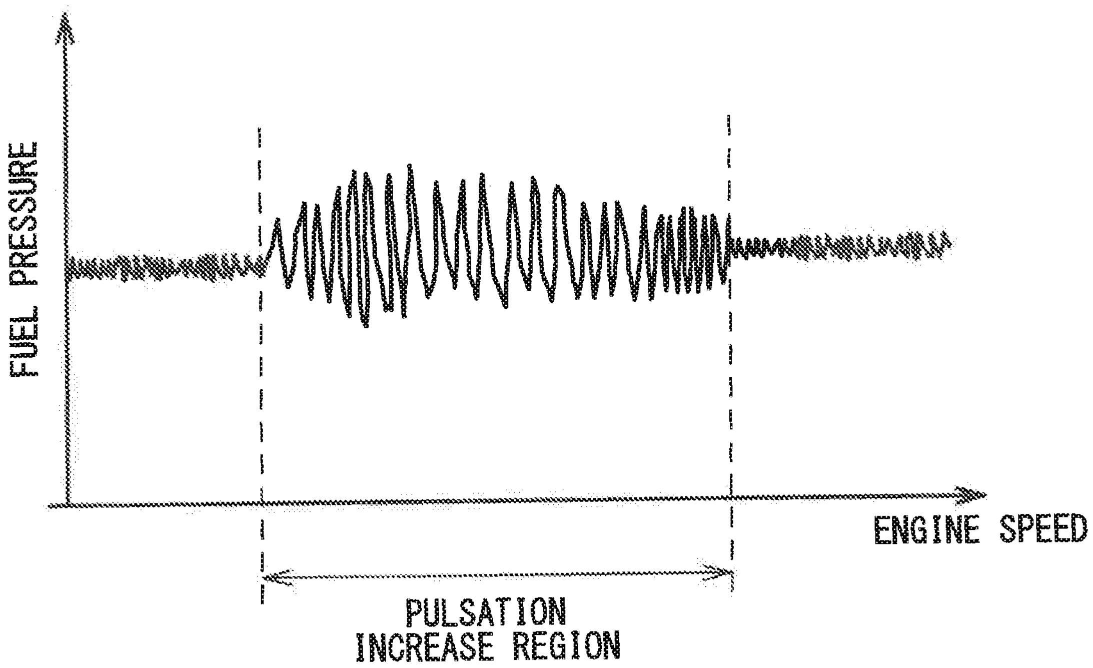
FIG. 2 is a waveform chart of fuel pressure.

Next, a description will be given of the fuel pressure pulsation caused by the high pressure pump 31. FIG. 2 is a waveform chart of the fuel pressure. The vertical axis indicates the fuel pressure. The horizontal axis indicates the engine speed. As illustrated in FIG. 2, the engine speed region includes a pulsation increase region in which the fuel pressure pulsation within the low pressure fuel pipe 25 and the low pressure delivery pipe 26 increases within a predetermined rotational speed region as compared with other rotational speed regions. The pulsation increase region is, for example, from 1000 rpm to 1200 rpm in the engine speed, but is not limited thereto.

The reason why the fuel pressure pulsation occurs in this way is as follows. The cylinder injection valves 37 are not used until the engine speed reaches a predetermined rotational speed from the time of starting, and fuel injection by the port injection valves 27 is executed. In this period, the electromagnetic valve 32 is maintained in the opened state while the plunger 31*p* repeats lifting up and down in accordance with the power of the engine 10. For this reason, the fuel suction and discharge is repeated between the low pressure fuel pipe 25 and the pressurizing chamber 31*a*, and therefore the pulsation occurs and propagates to the low pressure delivery pipe 26. Also, the amplitude of the fuel pressure pulsation further increases, when the frequency of the fuel pressure pulsation coincide and resonate with the natural frequency of the pulsation damper 29.

Figure 3:
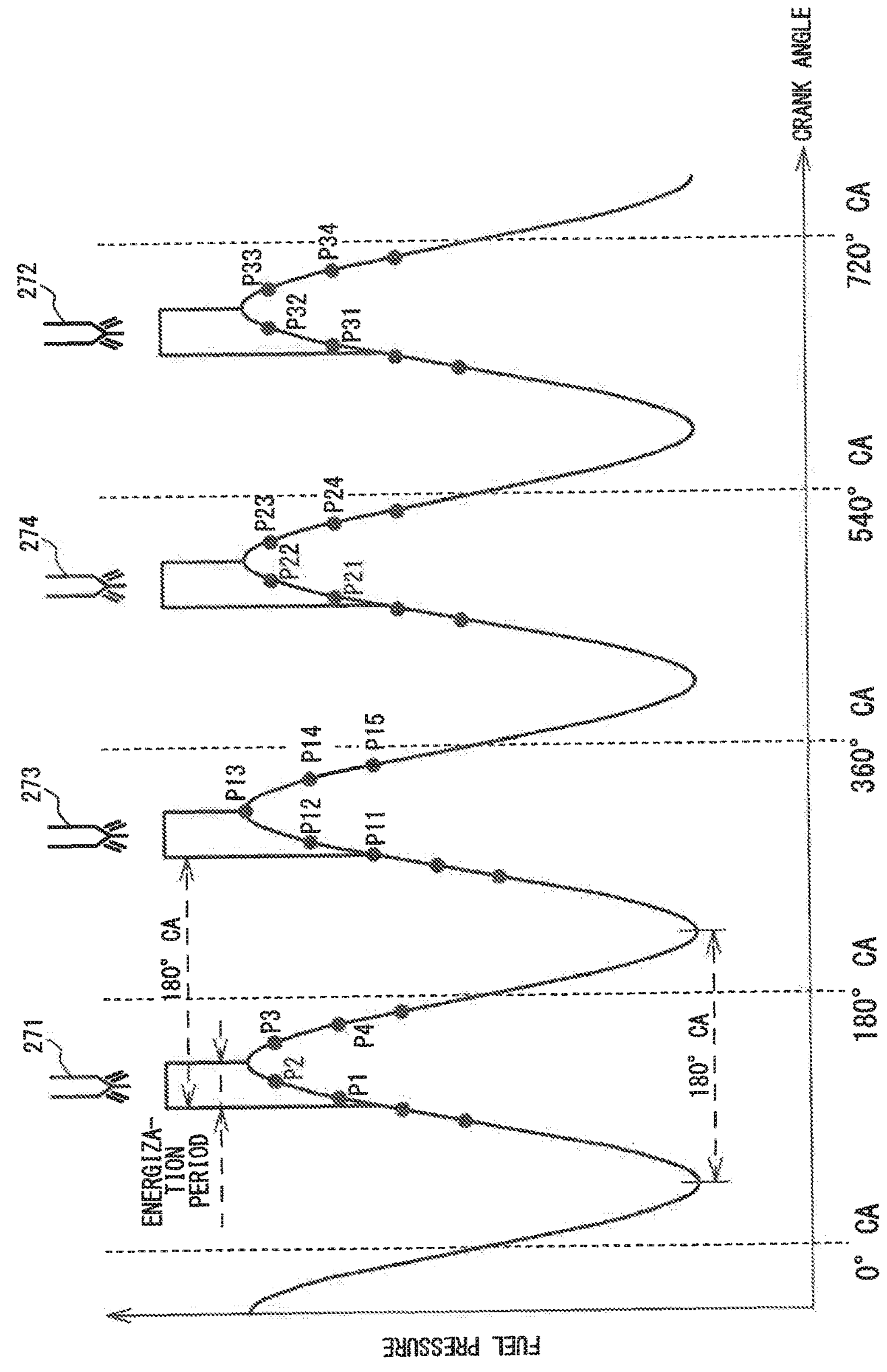
FIG. 3 is the graph illustrating an example of a waveform of the fuel pressure pulsation, and injection timing and energization periods of port injection valves.

FIG. 3 is a graph illustrating an example of a waveform of the fuel pressure pulsation and the injection timing and the energization period of the port injection valves 271 to 274. A vertical axis illustrates the fuel pressure, and a horizontal axis illustrates the crank angle. FIG. 3 illustrates the waveform of the fuel pressure pulsation when the engine speed falls within the pulsation increase region described above. Note that, each injection timing of the port injection valves 271 to 274 is not limited to the crank angle position illustrated in FIG. 3. Also, the energization periods of the port injection valves 271 to 274 are not limited to the example illustrated in FIG. 3. As described above, the lifting up and down of the plunger 31*p* of the high pressure pump 31 causes the fuel pressure pulsation in the low pressure delivery pipe 26. Herein, as described above, while the crankshaft 14 rotates twice, that is, at 720 crank angle degrees, the cam CP rotates once, and the cam CP has a substantially square shape. Therefore, during this time, the plunger 31*p* is lifted up and down four times, and the fuel pressure pulsation is generated for four cycles. That is, the pulsation cycle of the fuel pressure is 180 crank angle degrees.

Each injection timing is set in synchronization with the crank angle so that the fuel is injected in the order of the port injection valves 271, 273, 274, and 272. Also, each interval of injection timing is constant and 180 crank angle degrees. Each of the port injection valves 271 to 274 opens only for the energization period calculated for each of the port injection valves 271 to 274 with reference to a preset injection timing.

As described above, each of the pulsation cycle and the interval between the injection timing of the port injection valves 271 to 274 is 180 crank angle degrees. Therefore, the pulsation cycle and the interval between the injection timing of the port injection valves 271 to 274 are substantially the same regardless of the engine speed. Although the injection timing of the port injection valves 271 to 274 may be advanced or retarded as a whole in accordance with the driving state of the engine 10, the interval itself of the injection timing is generally constant.

Additionally, FIG. 3 illustrates fuel pressure values P1, P2 . . . detected by the fuel pressure sensor 28 in this order. The detection by the fuel pressure sensor 28 is executed over the entire range of the crank angle at predetermined time intervals, and FIG. 3 illustrates only a part of the detected fuel pressure values denoted by reference numerals. The time interval of detection by the fuel pressure sensor 28 is set to be shorter than the minimum period of each energization period of the port injection valves 271 to 274 which is preset in accordance with the state of the engine 10. Thus, the fuel pressure sensor 28 can detect the fuel pressure during the injection of each port injection valves 271 to 274 at least once.

Next, a description will be given of calculation of each energization period of the port injection valves 271 to 274. On the basis of the fuel pressure detected by the fuel pressure sensor 28, the ECU 41 calculates each energization period T (ms) of the port injection valves 271 to 274 such that each port injection valves 271 to 274 injects fuel only by the required injection quantity Q (mL). Specifically, the energization period τ is calculated by the following equation (1).

$$\tau=(Q/Q_{INJ})\times\sqrt{P_0/P}\times 60\times 1000 \quad (1)$$

$Q_{INJ}$ (mL/min) is a nominal flow rate of each of the port injection valves 271 to 274. $P_0$ (kPa) is an inspection pressure corresponding to each nominal flow rate of the port injection valves 271 to 274. $Q_{INJ}$ and $P_0$ are experimentally calculated beforehand and stored in the ROM. P (kPa) is a fuel pressure value detected by the fuel pressure sensor 28. When the energization period τ of each of the port injection valves 271 to 274 is calculated, the ECU 41 instructs the driver circuit 42 to energize the port injection valves 271 to 274 only for the energization period τ calculated at each injection timing thereof, which injects fuel. In this way, each energization period of the port injection valves 271 to 274 are set based on the required injection quantity and the detected fuel pressure. For example, when the fuel pressure pulsation is small, the detected fuel pressure value is substantially constant. Because of that, the energization period is calculated by use of the fuel pressure value detected at arbitrary timing or of the smoothed value of the fuel pressure detected twice or more as the fuel pressure value.

However, when the engine speed falls within the pulsation increase region as illustrated in FIG. 3, the fuel pressure value is unstable. If the energization period is calculated based on the fuel pressure value detected at arbitrary timing as described above, it might be difficult to accurately calculate the energization period corresponding to the required injection quantity, which might not accurately control the fuel injection quantity. Hence, when the fuel pressure pulsation greatly influences the calculation of the energization periods to the port injection valves 271 to 274, the ECU 41 executes the port injection control different from the case where the fuel pressure pulsation is small. Specifically, the port injection control in the case at the time when the fuel pressure pulsation increases includes fuel pressure obtaining control and port injection execution control. The fuel pressure obtaining control obtains the fuel pressure at the time when the fuel pressure pulsation increases. The port injection execution control executes the port injection based on the obtained fuel pressure. In addition, the ECU 41 simultaneously executes the fuel pressure obtaining control and the port injection execution control.

Note that, the fuel pressure obtaining control and the port injection execution control described below, terms mean as follows. The current time of detection means the time when the latest fuel pressure is detected by the fuel pressure sensor 28. The previous time of detection means the time when the fuel pressure is detected just before the latest fuel pressure is detected. Also, the previous time of detection and the current time of detection by the fuel pressure sensor 28 are referred to as the previous detection time and the current detection time, respectively. The cases where any of the port injection valves 271 to 274 do not inject fuel at the time of the previous detection and the current detection are referred to as the previous non-injection and the current non-injection, respectively. The cases where any one of the port injection valves 271 to 274 injects fuel at the time of the previous detection and the current detection are referred to as the previous injection and the current injection, respectively.

Figure 4:
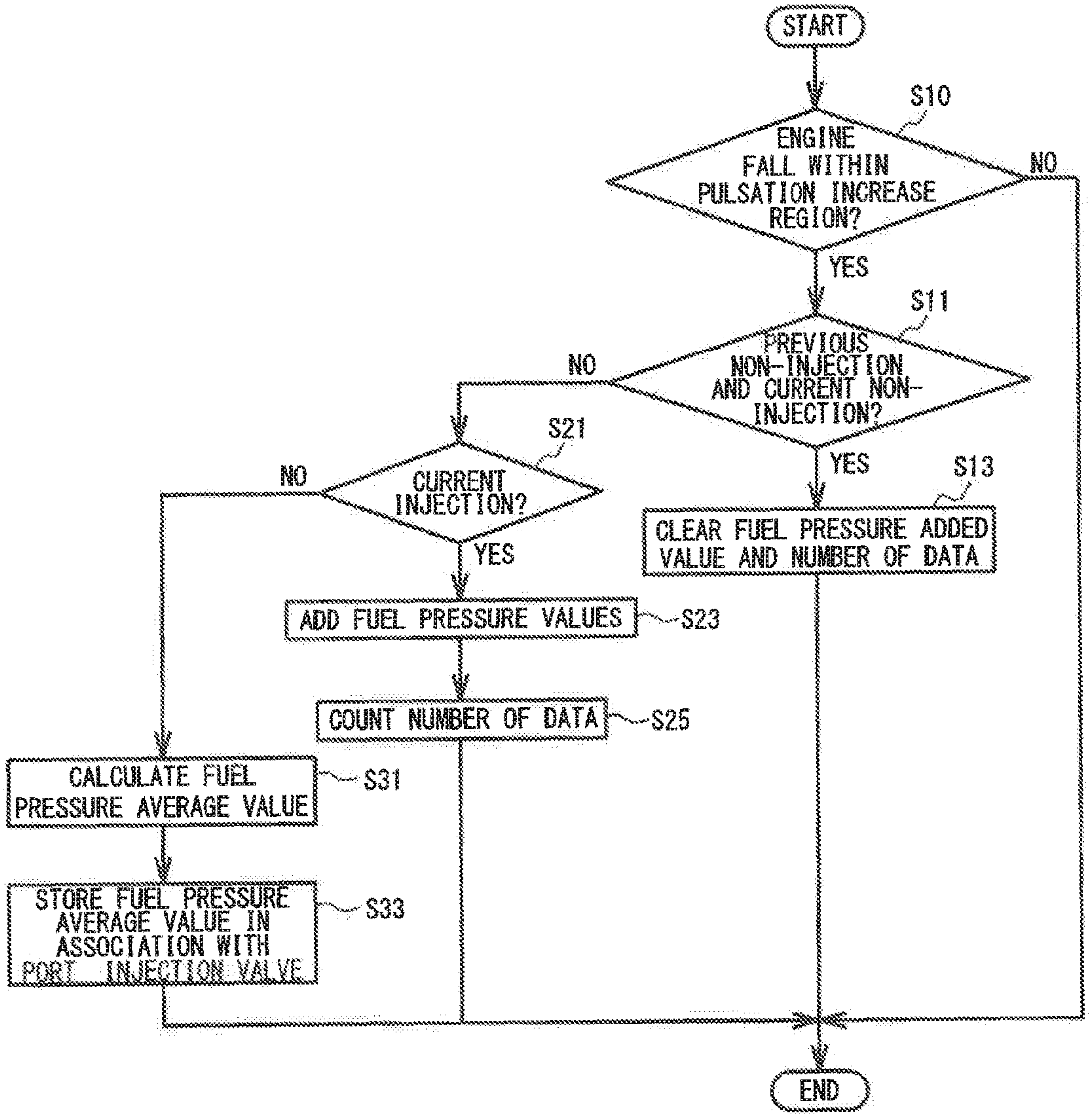
FIG. 4 is a flowchart illustrating an example of fuel pressure obtaining control executed by an ECU.

FIG. 4 is a flowchart illustrating an example of the fuel pressure obtaining control executed by the ECU 41. The ECU 41 executes a series of processes of the fuel pressure obtaining control every time the fuel pressure sensor 28 detects once. Specifically, the ECU 41 determines whether or not the engine speed calculated based on the crank angle sensor 14*a* falls within the above-described pulsation increase region (step S10). The pulsation increase region is experimentally calculated beforehand and stored in the ROM and is the engine speed when the fuel pressure pulsation greatly influences the calculation of each energization period of the port injection valves 271 to 274. Specifically, the pulsation increase region is a range where a difference between the actual fuel injection quantity and the required injection quantity exceeds an allowable range. The actual fuel injection quantity is controlled based on the fuel pressure value detected at arbitrary timing or on a smoothed value of the fuel pressure. The process of step S10 is an example of the process executed by a determinator configured to determine whether or not the fuel pressure pulsation greatly influences the calculation of each energization period of the port injection valves 271 to 274 on the basis of the rotational speed of the crankshaft 14. When a negative determination is made in step S10, the process finishes.

When an affirmative determination is made in step S10, the ECU 41 determines whether or not there are the previous non-injection and the current non-injection by the fuel pressure sensor 28 (step S11). When an affirmative determination is made in step S11, the ECU 41 clears the fuel pressure added value and the number of data (step S13) as will be described in detail later.

When a negative determination is made in step S11, the ECU 41 determines whether or not there is the current injection (step S21). When an affirmative determination is made, the ECU 41 adds the detected fuel pressure value to the already detected fuel pressure value (step S23) and counts the added number of data of the fuel pressure value (step S25). Also, the previous non-injection and the previous injection are included in the case where it is determined that there is the current injection in step S21. In the case of the previous non-injection, the fuel pressure value at the current detection time is added to zero (step S23), and the number of data is counted as one (step S25). In the case of the previous injection, the processes of steps S23 and S25 have already been executed before the current injection, the fuel pressure value at the current detection time is added to the fuel pressure value before the current injection (step S23), and the added number of the fuel pressure value is incremented (step S25).

Negative determinations in steps S11 and S21 means that the previous injection and the current non-injection, and the ECU 41 calculates the average value of the fuel pressure (step S31). Specifically, the added fuel pressure value in step S23 is divided by the number of data counted in step S25, so that the average value of the fuel pressure values is calculated.

The ECU 41 associates the calculated fuel pressure average value with the port injection valve scheduled to inject fuel next among the port injection valves 271 to 274 and stores them in the RAM (step S33). The port injection valve scheduled to inject fuel next is a port injection valve that is scheduled to inject fuel next to the port injection valve previously injected fuel. The injection order of the port injection valves 271 to 274 is predetermined as described above, and the injection timing of each port injection valve is set beforehand in synchronization with the crank angle. Thus, the ECU 41 can determines the port injection valve scheduled to inject fuel next on the basis of the current crank angle. The process of step S33 is an example of the process executed by the storage configured to store the fuel pressure detected during the injection of the one port injection valves 27 in association with the another port injection valve, when it is determined that the fuel pressure pulsation greatly influences calculation of each energization period of the port injection valves 271 to 274.

An example of the fuel pressure obtaining control will be described with reference to FIG. 3. As illustrated in FIG. 3, it is assumed that the fuel pressure values P1 and P2 among the fuel pressure values P1 to P4 are detected during the injection of the port injection valve 271. For example, When the fuel pressure value P1 is detected, the port injection valve 271 injects fuel at the current detection time. Thus, a negative determination is made in step S11 and an affirmative determination is made in step S21, so that the fuel pressure value P1 is stored as the initial value of the fuel pressure (Step S23), and the number of data is counted as one (step S25). When the fuel pressure value P2 is detected next time, the injection of the port injection valve 271 is continued at the current detection time. Thus, a negative determination is made in step S11 and an affirmative determination is made in step S21, so that the fuel pressure value P2 is set to the fuel pressure value P1 (Step S23), and the number of data is counted as two (step S25). When the fuel pressure value P3 is detected, negative determinations are made in steps S11 and S21, so that an average value of the fuel pressure values P1 and P2 is calculated (step S31), and the average value is stored in association with the port injection valve 273 scheduled to inject fuel next in the RAM (step S33). The process of step S31 is an example of the process executed by an average value calculator configured to calculate an average value of detected fuel pressures when there are fuel pressures detected during the injection of the one port injection valve. When the fuel pressure value P4 is detected, an affirmative determination is made in step S11, so that the added value and the number of data of the fuel pressure values P1 and P2 stored in the RAM in steps S23 and S25 are cleared as unnecessary.

Sometimes three fuel pressure values such as the fuel pressure values P11 to P13 are detected during injection of the port injection valve 273. This is because, even in a case of the constant time interval of the detection timing of the fuel pressure sensor 28, the rotational speed of the crankshaft 14 varies with the acceleration and deceleration requesting to the engine 10, and the detected number of fuel pressure varies during the injection of one port injection valve. Also in this case, when the fuel pressure value P14 is detected, an average value of the fuel pressure values P11 to P13 is calculated (step S31) and is stored in association with the port injection valve 274 scheduled to inject fuel in the RAM (step S33). When the fuel pressure value P15 is detected, the added value and the number of data of the fuel pressure values P11 to P13 are cleared (step S13).

Likewise, when the fuel pressure value P23 is detected, the average value of the fuel pressure values P21 and P22 detected during the injection of the port injection valve 274 is stored in association with the port injection valve 272 scheduled to inject fuel next in the RAM. When the fuel pressure value P24 is detected after that, the added value and the number of data of the fuel pressure values P21 and P22 are cleared. Similarly, as for the port injection valve 272, when the fuel pressure value P33 is detected, the average value of the fuel pressure values P31 and P32 detected during the injection of the port injection valve 272 is stored in association with the port injection valve 271 scheduled to inject fuel next in the RAM. When the fuel pressure value P34 is detected, the added value and the number of data of the fuel pressure values P31 and P32 are cleared. The fuel pressure added value and the number of data which became unneeded after the fuel pressure average value is stored are cleared as described above. This makes it possible to ensure the memory area needed for executing the processes of the next steps S23 and S25.

Further, the series of processes in FIG. 4 are repeated while the engine 10 is driving, the average fuel pressure value stored in the RAM is updated at any time. The latest fuel pressure average value is stored in association with each of the port injection valves 271 to 274.

When the number of detected fuel pressures during the injection of the port injection valve is one, the detected one fuel pressure value is calculated as the fuel pressure average value and is stored in association with the port injection valve scheduled to inject fuel next in the RAM.

Figure 5:
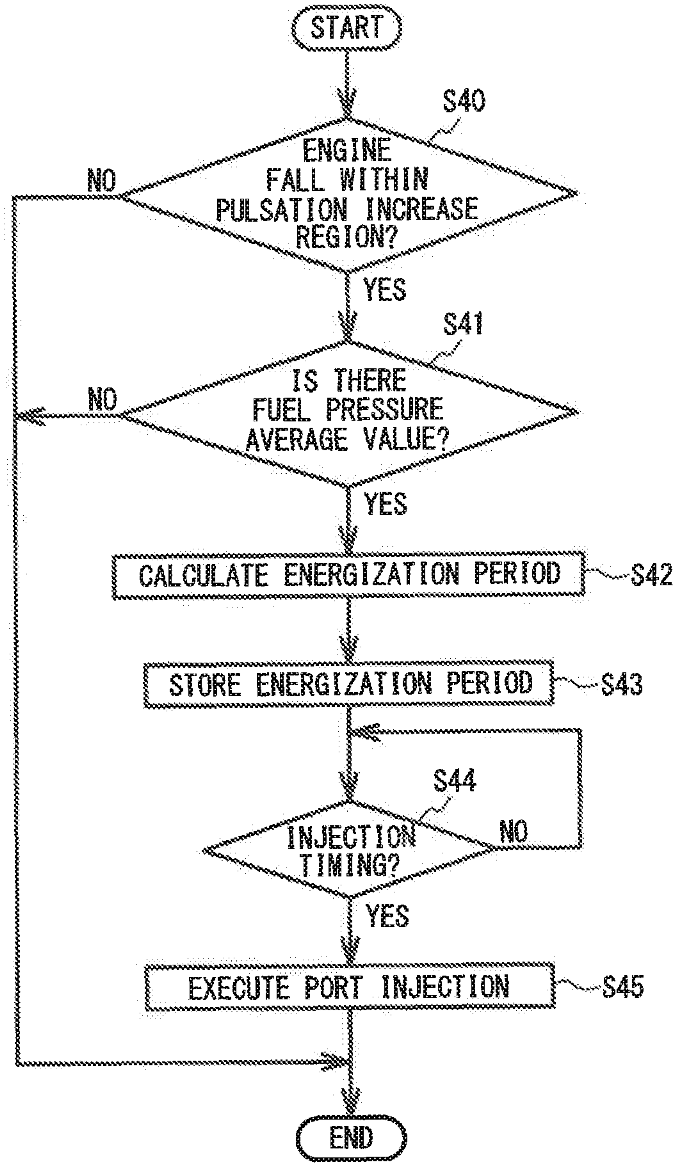
FIG. 5 is a flowchart illustrating an example of port injection execution control executed by the ECU.

Next, a description will be given of the port injection execution control for executing port injection on the basis of the fuel pressure obtained above. FIG. 5 is a flowchart illustrating an example of the port injection execution control executed by the ECU 41. The ECU 41 determines whether or not the engine speed is included in the pulsation increase region (step S40). When a negative determination is made, this control finishes. When an affirmative determination is made, the ECU 41 determines whether or not there is a fuel pressure average value stored in the RAM (step S41). When a negative determination is made, this control finishes.

When an affirmative determination is made in step S41, the energization period $\tau$ of the port injection valve scheduled to inject fuel next stored in association with the fuel pressure average value is calculated by the above expression (1) on the basis of the stored fuel pressure average value (Step S42). The calculated energization period $\tau$ is stored in the RAM in association with the port injection valve scheduled to inject fuel next stored in association with the fuel pressure average value (step S43). The processes in steps S42 and S43 may be completed after the processes in steps S31 and S33 is completed before the injection timing of the port injection valve scheduled to inject fuel next arrives. This ensures a period for executing the processes in steps S42 and S43. The process of step S42 is an example of the process executed by the calculator configured to calculate an energization period of another port injection valve based on the stored fuel pressure, when it is determined that the fuel pressure pulsation greatly influences calculation of each energization period of the port injection valves 271 to 274.

Then, it is determined whether or not the injection timing of the port injection valve scheduled to inject fuel next arrives on the basis of the crank angle (step S44). When a negative determination is made, the process in step S44 is executed again. When an affirmative determination is made, the target port injection valve is energized by the energization period $\tau$ stored in the RAM, and the port injection is executed (step S45). In this manner, the injection quantity of the current port injection valve is controlled on the basis of the fuel pressure obtained during the previous injection of the port injection valve.

For example, as illustrated in FIG. 3, when the average value of the fuel pressure values P1 and P2 is stored in the RAM, an affirmative determination is made in step S41 and the energization period of the port injection valve 273 is calculated and stored (steps S42 and S43). When the injection timing of the port injection valve 273 arrives, the injection of the port injection valve 273 is executed for the calculated energization period (step S45). In this case, as described above, the energization period of the port injection valve 273 may be calculated after the injection of the port injection valve 271 is completed and the average value of the fuel pressure values P1 and P2 is stored in the RAM (step S33), before the injection timing of the port injection valve 273 scheduled to inject fuel next arrives.

Likewise, the energization period of the port injection valve 274 is calculated and stored based on the average value of the fuel pressure values P11, P12, and P13, and the port injection valve 274 is energized only for this energization period. The energization period of the port injection valve 272 is calculated and stored based on the average value of the fuel pressure values P21 and P22, and the port injection valve 272 is energized only for this energization period.

Here, as described above, the interval between the injection timing of the port injection valves 271 to 274 is the same as the pulsation cycle. Also, the behavior of the change in the fuel pressure may not vary greatly within the period of one cycle of the fuel pressure pulsation. Therefore, the fuel pressure during the injection of one port injection valve may be substantially the same as the fuel pressure during the injection of the other port injection valve scheduled to inject fuel after one cycle of the fuel pressure pulsation elapsing from the injection time of the one port injection valve. In this way, the energization period of the other port injection valve scheduled to inject fuel after one cycle of the fuel pressure pulsation is calculated on the basis of the actual fuel pressure during the injection of one port injection valve, and the fuel injection quantity is controlled. This can accurately control each fuel injection quantity of the port injection valves 271 to 274 and the air-fuel ratio, even when the fuel pressure pulsation occurs.

In addition, the fuel pressure in the low pressure delivery pipe 26 also slightly decreases due to any injection of the port injection valves 271 to 274 thereduring. For this reason, the decrease in the fuel pressure caused by this injection reflects the fuel pressure value detected during the injection of one port injection valve. On the basis of the fuel pressure value reflected by the decrease in the fuel pressure caused by such injection itself, the energization period of the other port injection valve scheduled to inject fuel after one cycle of the fuel pressure pulsation. This accurately controls the quantity of fuel injected from the other port injection valve.

Moreover, when fuel pressure values are detected during the injection of one port injection valve, the energization period of the other port injection valve is calculated based on the average fuel pressure value, which can accurately control the fuel injection quantity of the other port injection valve.

In the present embodiment, it is possible to calculate the energization period of the other port injection valve scheduled to inject fuel after two cycles, not one cycle, of the fuel pressure pulsation elapsing from the injection time of one port injection valve. This is because two cycles of the fuel pressure pulsation correspond to 360 crank angle degrees, and the behavior of the fuel pressure may not greatly different within this period. Also, in a case of calculating the energization period of the other port injection valve scheduled to inject fuel after two cycles of the fuel pressure pulsation elapsing from the time of the injection of one port injection valve on the basis of the fuel pressure detected during the injection of the one port injection valve, time to calculate the energization period can be further ensured.

Additionally, the energization period of the port injection valve, which is scheduled to inject fuel immediately after the engine speed exceeds the lower limit value of the pulsation increase region, may be calculated based on the fuel pressure value detected immediately before the engine speed exceeds the lower limit value of the pulsation increase region or based on the smoothed value of the fuel pressure values detected twice or more before the engine speed exceeds the lower limit value. The energization period of the port injection valve, which is scheduled to inject fuel immediately after the engine speed exceeds the upper limit value of the pulsation increase region, may be calculated based on the fuel pressure value detected immediately after the engine speed exceeds the upper limit value of the pulsation increase region.

Next, variations of the above embodiment will be described. Additionally, the same reference numerals will be used for the same components as those in the above embodiment unless otherwise specified, and redundant description will be omitted.

Figure 6:
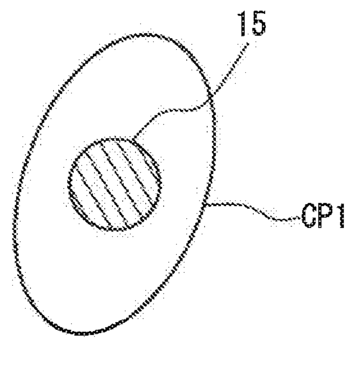
FIG. 6 is an explanatory view of a cam in the first variation.
Figure 7:
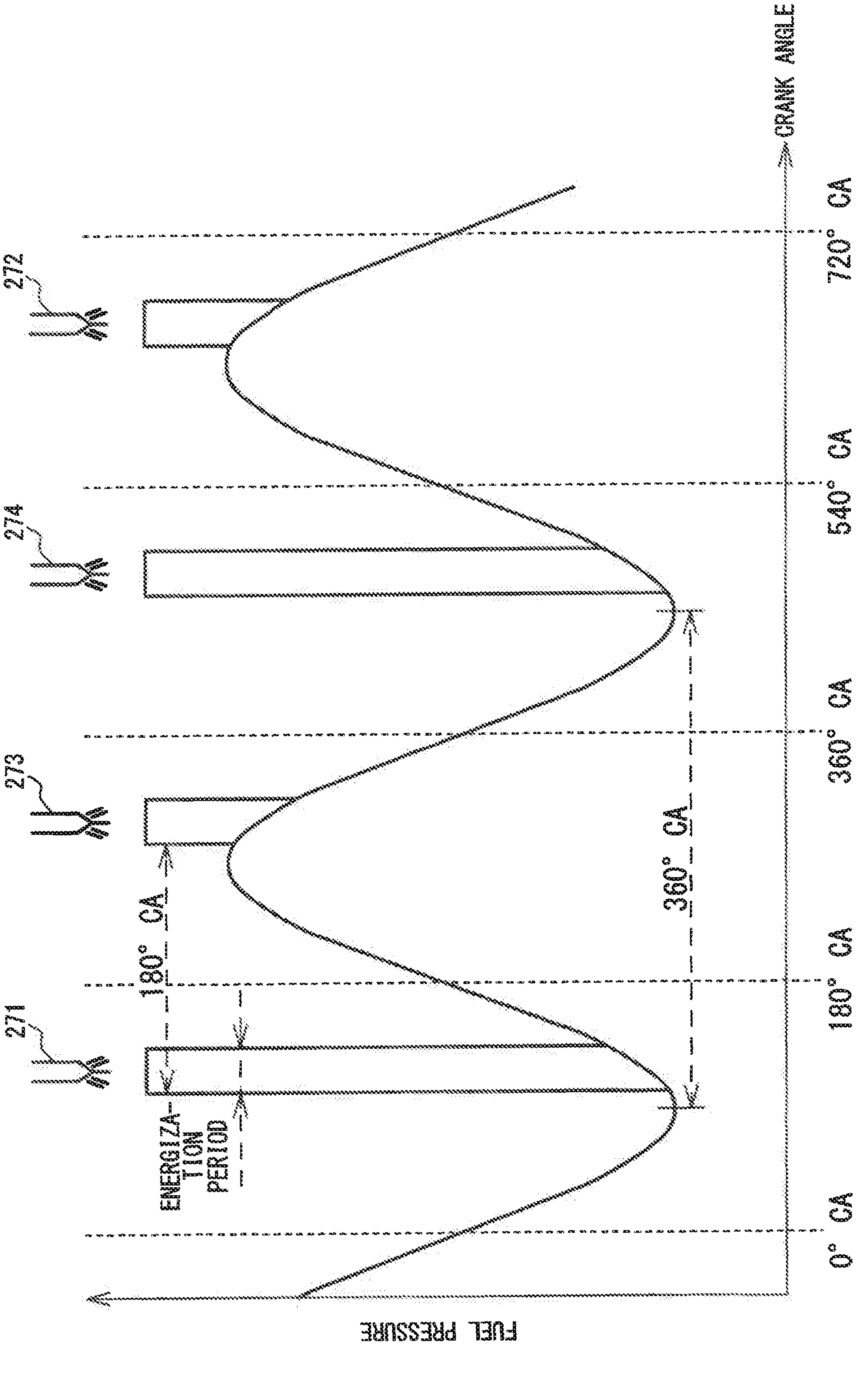
FIG. 7 is a graph illustrating a fuel pressure waveform and injection timing of the port injection valves in the first variation.

The first variation will be described. FIG. 6 is an explanatory illustration of a cam CP1 of the first variation. FIG. 7 is a graph illustrating a fuel pressure waveform and injection timing of the port injection valves 271 to 274 in the first variation. In the graph of the variation described below, the detection timing of the fuel pressure sensor 28 is omitted, and the injection timing of the port injection valve is not limited to the crank angle position illustrated therein. As described above, the interval between the injection timing of the port injection valves 271 to 274 is 180 crank angle degrees.

On the other hand, the cam CP1 of the first variation has a substantially elliptical shape. Therefore, while the crankshaft 14 rotates 720 crank angle degrees, the plunger 31*p* of the high pressure pump 31 reciprocates twice, and the pulsation cycle is 360 crank angle degrees. Therefore, the interval between the injection timing of the port injection valves 271 to 274 is a half of the pulsation cycle. Accordingly, the port injection valve, which is scheduled to inject fuel after one cycle of the fuel pressure pulsation elapsing from the injection timing of the port injection valve 271, is not the port injection valve 273 scheduled to inject fuel next to the port injection valve 271, but the port injection valve 274 scheduled to inject fuel the injection after the next. Likewise, the port injection valves scheduled to inject fuel after one cycle of the fuel pressure pulsation elapsing from the injection timing of the port injection valves 273, 274, and 272 are the port injection valves 272, 271, and 273, respectively.

Thus, the fuel pressures during injection of the port injection valves 271, 273, 274, and 272 are considered to be the same as the fuel pressures during injection of the port injection valves 274, 272, 271, and 273 scheduled to inject fuel after one cycle of the fuel pressure pulsation elapsing from the fuel injection timing of the port injection valves 271, 273, 274, and 272, respectively. For this reason, the ECU 41 stores the fuel pressure average values during the injection of the port injection valves 271, 273, 274, and 272 in association with the port injection valves 274, 272, 271, and 273 in the RAM, respectively, and calculates each energization period. Such a configuration can also accurately control the fuel injection quantity of the port injection valve, even when the fuel pressure pulsation occurs.

The first variation preferably calculates the energization period of the other port injection valve scheduled to inject fuel not after two cycles, but after one cycle of the fuel pressure pulsation. This is because two cycles of the fuel pressure pulsation correspond to 720 crank angle degrees in the first variation, and the behavior of the fuel pressure may be different within this period.

Figure 8:
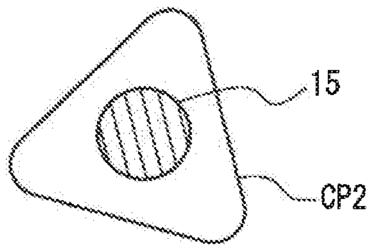
FIG. 8 is an explanatory view of a cam in the second variation.
Figure 9:
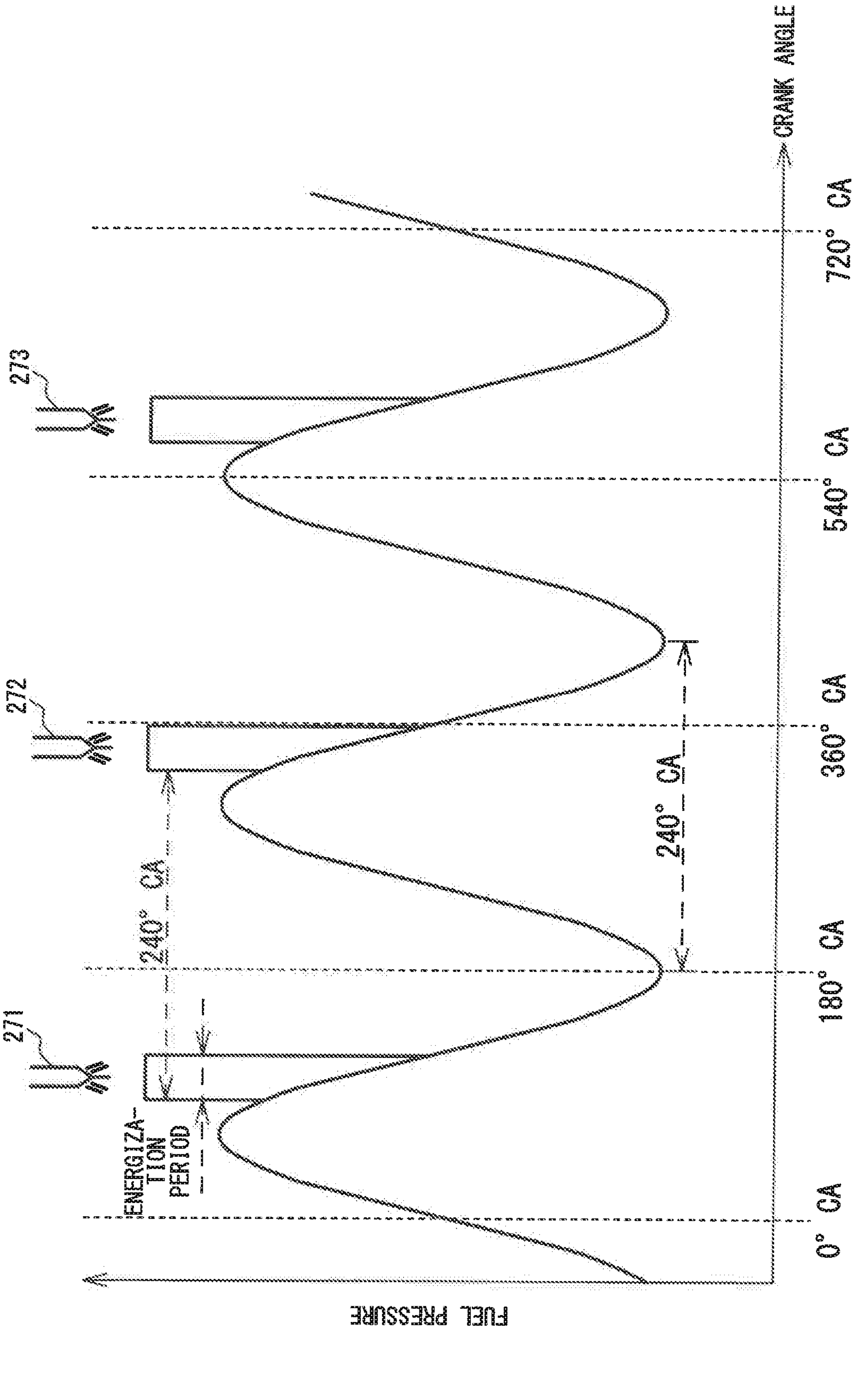
FIG. 9 is a graph illustrating a fuel pressure waveform and injection timing of the port injection valves in the second variation.

Next, the second variation will be described. FIG. 8 is an explanatory illustration of a cam CP 2 in the second variation. FIG. 9 is a graph illustrating a fuel pressure waveform and injection timing of the port injection valves 271 to 273 in the second variation. In the second variation, an engine is a three cylinder engine, and the port injection valves 271 to 273 corresponding to respective three cylinders inject fuel in this order. Therefore, the interval between the injection timing of the port injection valves 271 to 273 is 240 crank angle degrees which is one third of 760 crank angle degrees.

The cam CP2 in the second variation has a substantially equilateral triangular shape with round corners. For this reason, while the crankshaft 14 rotates 720 crank angle degrees, the plunger of the high pressure pump reciprocates three times and the pulsation cycle is the crank angle 240 crank angle degrees. The interval between the injection timing of the port injection valves 271 to 273 is substantially the same as the pulsation period.

Thus, the fuel pressures during the injection of the port injection valves 271 to 273 are considered to be substantially the same as the fuel pressure during the injection of the port injection valves 272, 273 and 271 scheduled to inject fuel after one cycle of the fuel pressure pulsation elapsing from the injection timing of the port injection valves 271 to 273, respectively. Therefore, the ECU 41 respectively stores the fuel pressure average values during injection of the port injection valves 271 to 273 in association with the port injection valves 272, 273 and 271 in the RAM, and calculate each energization period. For this reason, such a configuration can also accurately control the fuel injection quantity of the port injection valve, even when the fuel pressure pulsation occurs.

The second variation may calculate the energization period of the other port injection valve scheduled to inject fuel not after one cycle, but after two cycles of the fuel pressure pulsation. This is because two cycles of the fuel pressure pulsation correspond to 480 crank angle degrees, and the behavior of the fuel pressure may be different within this period.

Figure 10:
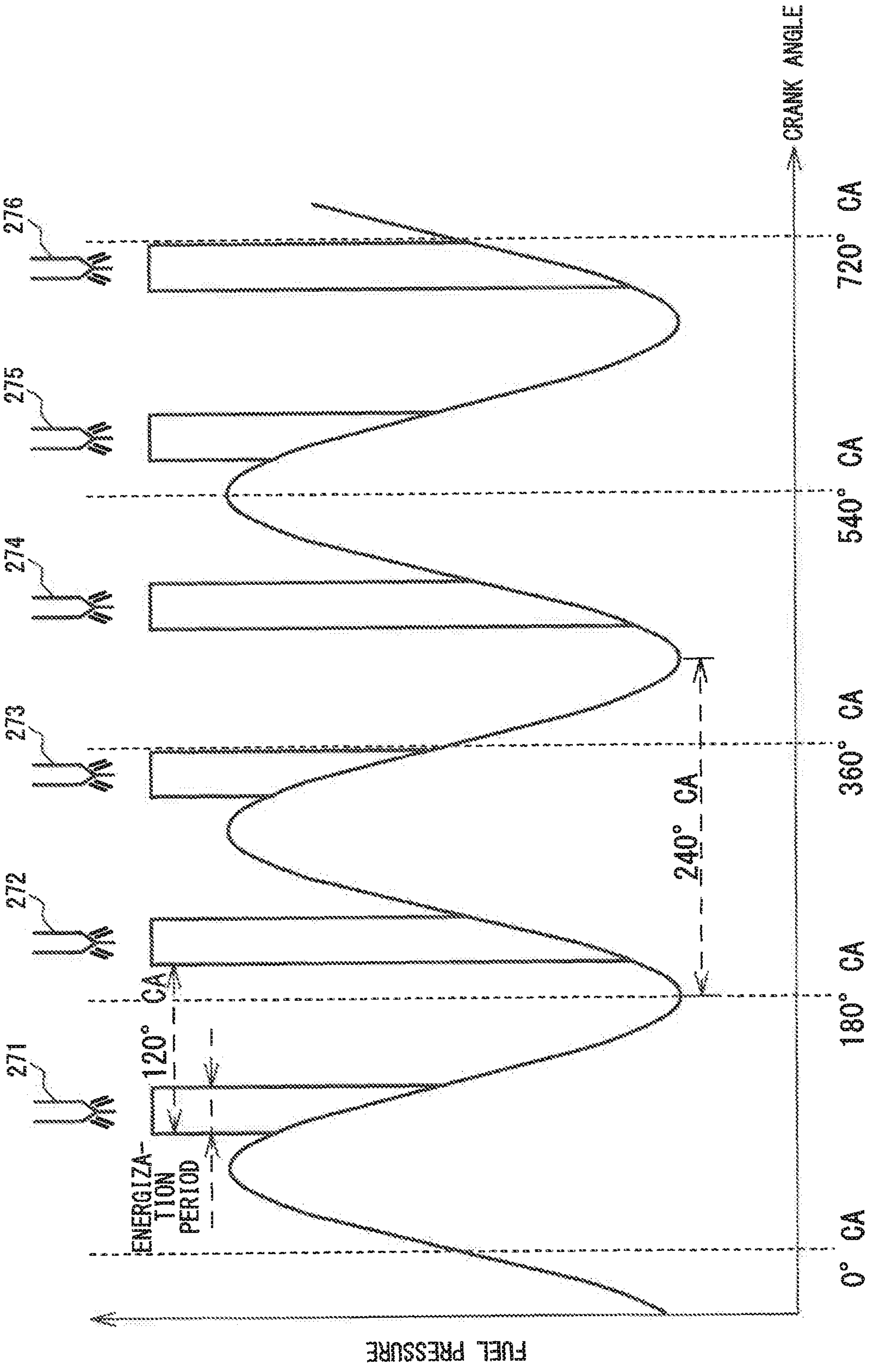
FIG. 10 is a graph illustrating a fuel pressure waveform and injection timing of the port injection valves in the third variation.

Next, the third variation will be described. FIG. 10 is a graph illustrating a fuel pressure waveform and injection timing of the port injection valves 271 to 276 in the third variation. A cam has a substantially equilateral triangular shape with round corners in the third variation similar to the second variation, so the pulsation cycle is 240 crank angle degrees which is the same as the second variation.

An engine in the third variation is a V-type six cylinder engine. The port injection valves 271 to 276 respectively correspond to six cylinders and inject fuel in the order. The interval between the injection timing of the port injection valves 271 to 276 is 120 crank angle degrees. Therefore, the interval between the injection timing of the port injection valves 271 to 276 is a half of the pulsation cycle.

Thus, the fuel pressures during the injection of the port injection valves 271 to 276 are considered to be substantially the same as the fuel pressure during the injection of the port injection valves 273 to 276, 271 and 272 scheduled to inject fuel after one cycle of the fuel pressure pulsation elapsing from the injection timing of the port injection valves 271 to 276, respectively. Therefore, the ECU 41 respectively stores the fuel pressure average values during injection of the port injection valves 271 to 276 in association with the port injection valves 273 to 276, 271, and 272 in the RAM, and calculates each energization period. For this reason, such a configuration can also accurately control the fuel injection quantity of the port injection valve even when the fuel pressure pulsation occurs.

Like the second variation, the third variation may calculate the energization period of the other port injection valve scheduled to inject fuel not after one cycle, but after one cycle of the fuel pressure pulsation.

Figure 11:
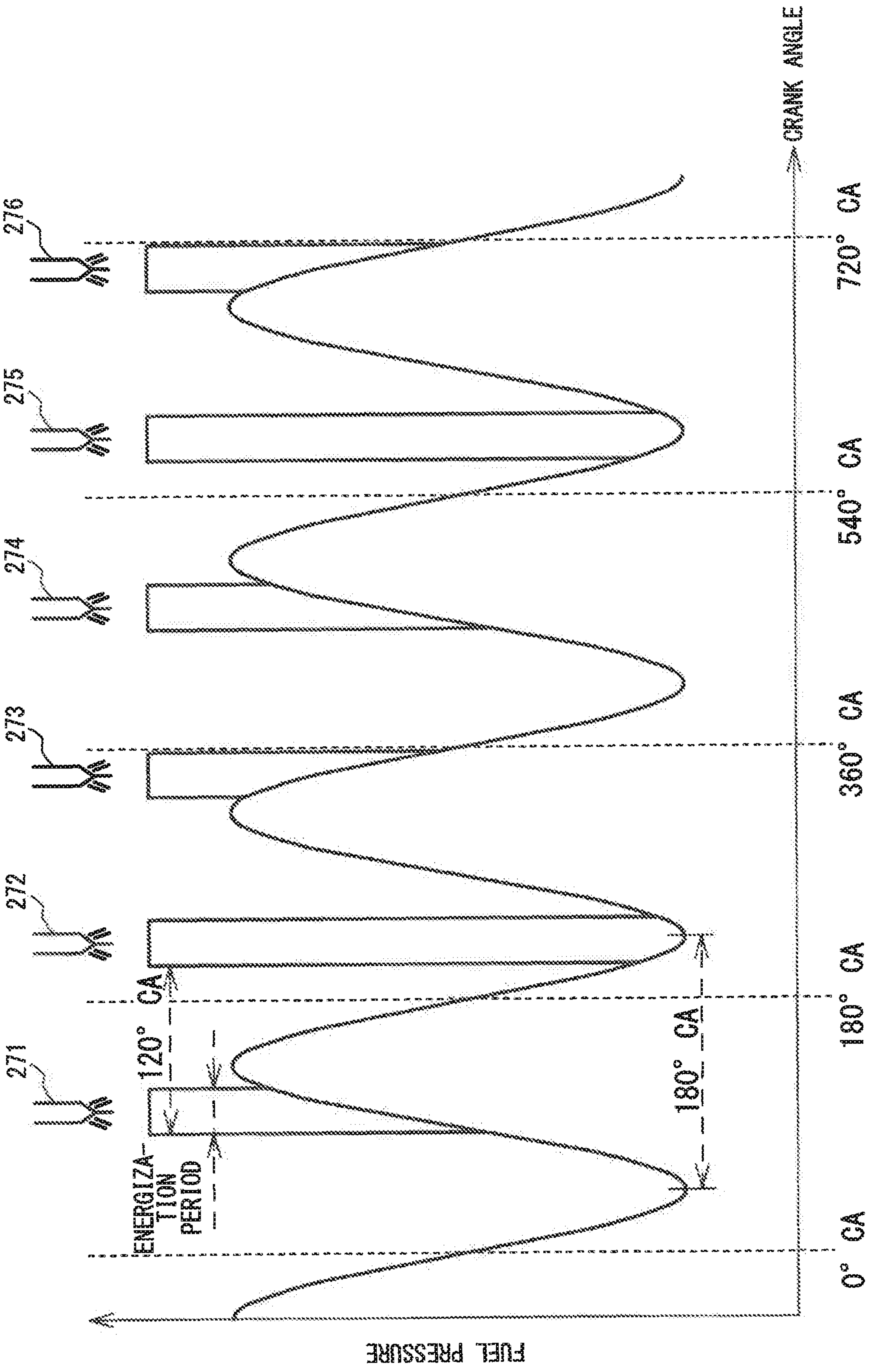
FIG. 11 is a graph illustrating a fuel pressure waveform and injection timing of the port injection valves in the fourth variation.

Next, the fourth variation will be described. FIG. 11 is a graph illustrating a fuel pressure waveform and the injection timing of the port injection valves 271 to 276 in the fourth variation. An engine in the fourth variation is a V-type six cylinder engine the same as the third variation. A cam in the fourth variation has a square shape with round corners, like the present embodiment illustrated in FIG. 1. The interval between the injection timing of the port injection valves 271 to 276 is 120 crank angle degrees. The pulsation cycle is 180 crank angle degrees. The interval between the injection timing of the port injection valves 271 to 276 is two thirds of the pulsation cycle.

Therefore, in the fourth modification, there is no port injection valve scheduled to inject fuel after one cycle of the fuel pressure pulsation elapsing from the injection of the port injection valve 271. The same applies to the other port injection valves 272 to 276. However, the port injection valve scheduled to inject fuel after two cycles of the fuel pressure pulsation elapsing from the injection of the port injection valve 271 is the port injection valve 274. Likewise, the port injection valves scheduled to inject fuel after two cycles of the fuel pressure pulsation elapsing from the injection of the port injection valves 272 to 276 are the port injection valves 275, 276, and 271 to 273, respectively. Here, the period corresponding to two cycles of the fuel pressure pulsation corresponds to 360 crank angle degrees, and it is considered that the behavior of the fuel pressure is not greatly different. Thus, the fuel pressures during the injection of the port injection valves 271 to 276 are considered to be substantially the same as the fuel pressure during the injection of the port injection valves 274 to 276 and 271 to 273 scheduled to inject fuel after two cycles of the fuel pressure pulsation elapsing from the injection timing of the port injection valves 271 to 276, respectively.

Therefore, the ECU 41 respectively stores the fuel pressure average values during injection of the port injection valves 271 to 276 in association with the port injection valves 274 to 276 and 271 to 273 in the RAM, and calculate each energization period. Therefore, such an configuration can also accurately control the fuel injection quantity of the port injection valve even when the fuel pressure pulsation occurs.

In the fourth variation, there is no port injection valve scheduled to inject fuel after three cycles of the fuel pressure pulsation elapsing from the injection of one port injection valve, whereas there is the other port injection valve scheduled to inject fuel after four cycles. However, the four cycles of the fuel pressure pulsation correspond to 720 crank angle degrees, and the behavior of change in the fuel pressure may be different within this period. Therefore, the fourth variation preferably calculates the energization period of the port injection valve scheduled to inject fuel after two cycles of the fuel pressure pulsation elapsing from the injection of one port injection valve.

Further, the engine may be a six-cylinder engine and the cam may be the elliptical cam CP1. Even in this case, the fuel pressure detected during the injection of one port injection valve is considered to be substantially the same as the fuel pressure during the injection of the other port injection valve scheduled to inject fuel after one cycle of the fuel pressure pulsation elapsing from the injection one port injection valve.

In the above embodiment and variations, on the basis of the average value of the fuel pressure detected during the injection of one port injection valve, the energization period of the other port injection valve is calculated, but the invention is not limited thereto. That is, on the basis of one fuel pressure value detected during the injection of one port injection valve, the energization period of the other port injection valve may be calculated after one or two cycles of the fuel pressure pulsation.

Figure 12:
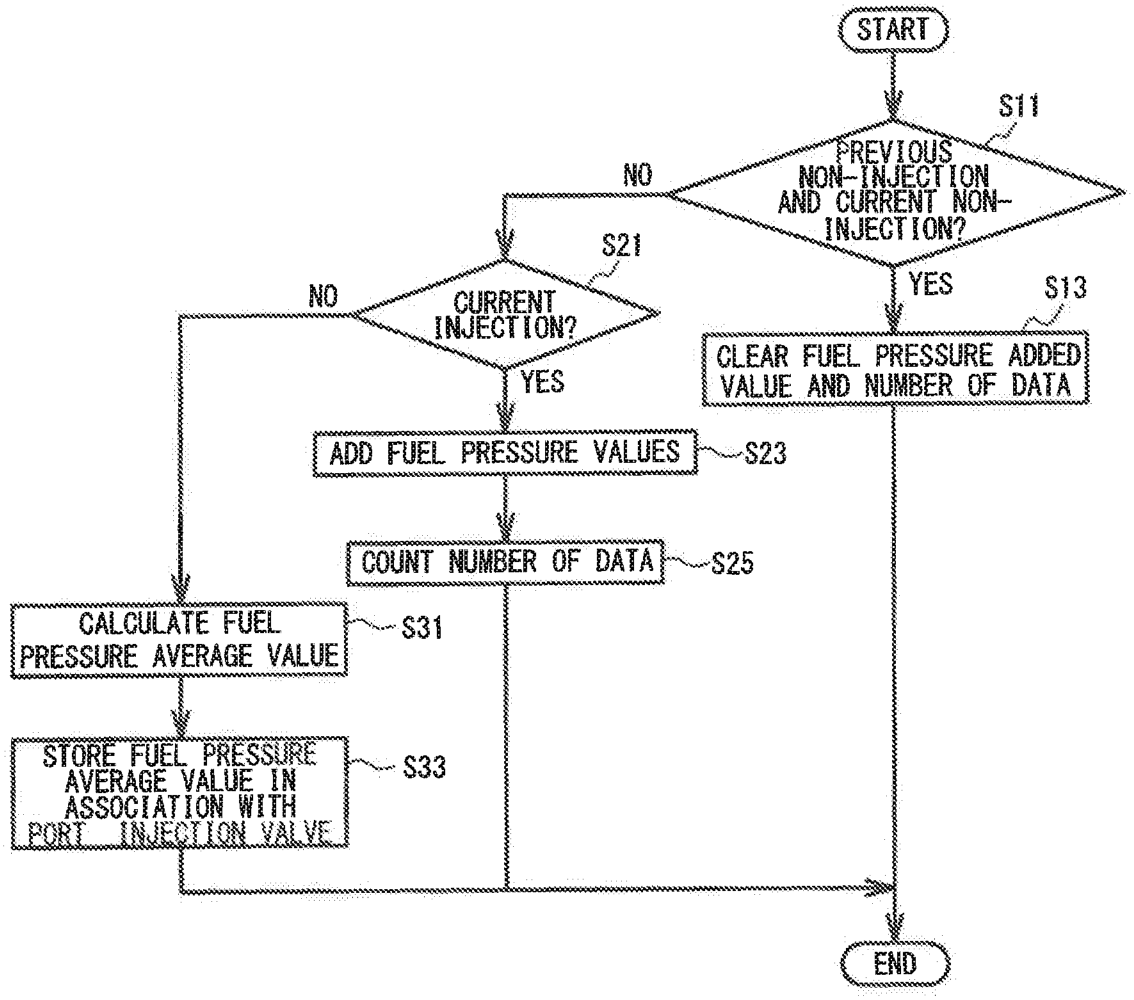
FIG. 12 is a flowchart illustrating an example of fuel pressure obtaining control executed by an ECU in the fifth variation.
Figure 13:
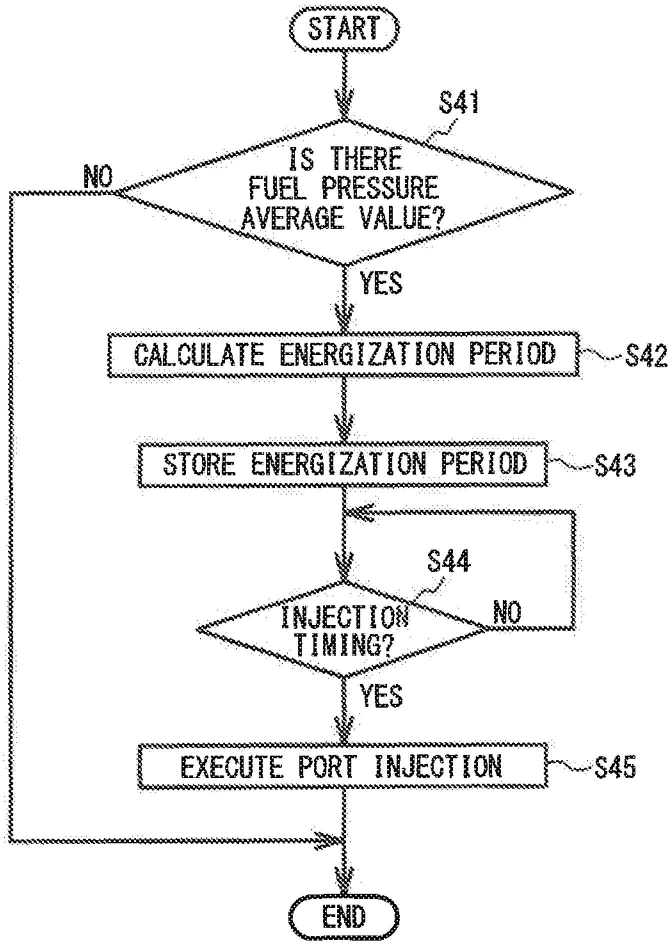
FIG. 13 is a flowchart illustrating an example of port injection execution control executed by an ECU in the fifth variation.

Next, the fifth variation will be described. FIG. 12 is a flowchart illustrating an example of the fuel pressure obtaining control executed by the ECU 41 in the fifth variation. FIG. 13 is a flowchart illustrating an example of the port injection execution control executed by the ECU 41 in the fifth modification. As illustrated in FIGS. 12 and 13, this flowchart is different from the flowchart illustrated in FIGS. 4 and 5 in that steps S10 and S40 are not executed. That is, on the basis of the fuel pressure value during the injection of one port injection valve as described above, the energization period of the other port injection valve is calculated, regardless of whether or not the engine speed falls within the pulsation increase region. This makes it possible to accurately control the fuel injection quantity of the other port injection valve even when the engine speed falls within a small pulsation region. This also eliminates the need for determining whether or not the engine speed falls within the pulsation increase region and the need for executing the different process depending on whether or not the engine speed falls within the pulsation increase region, thereby reducing the process load of the ECU 41.

Figure 14:
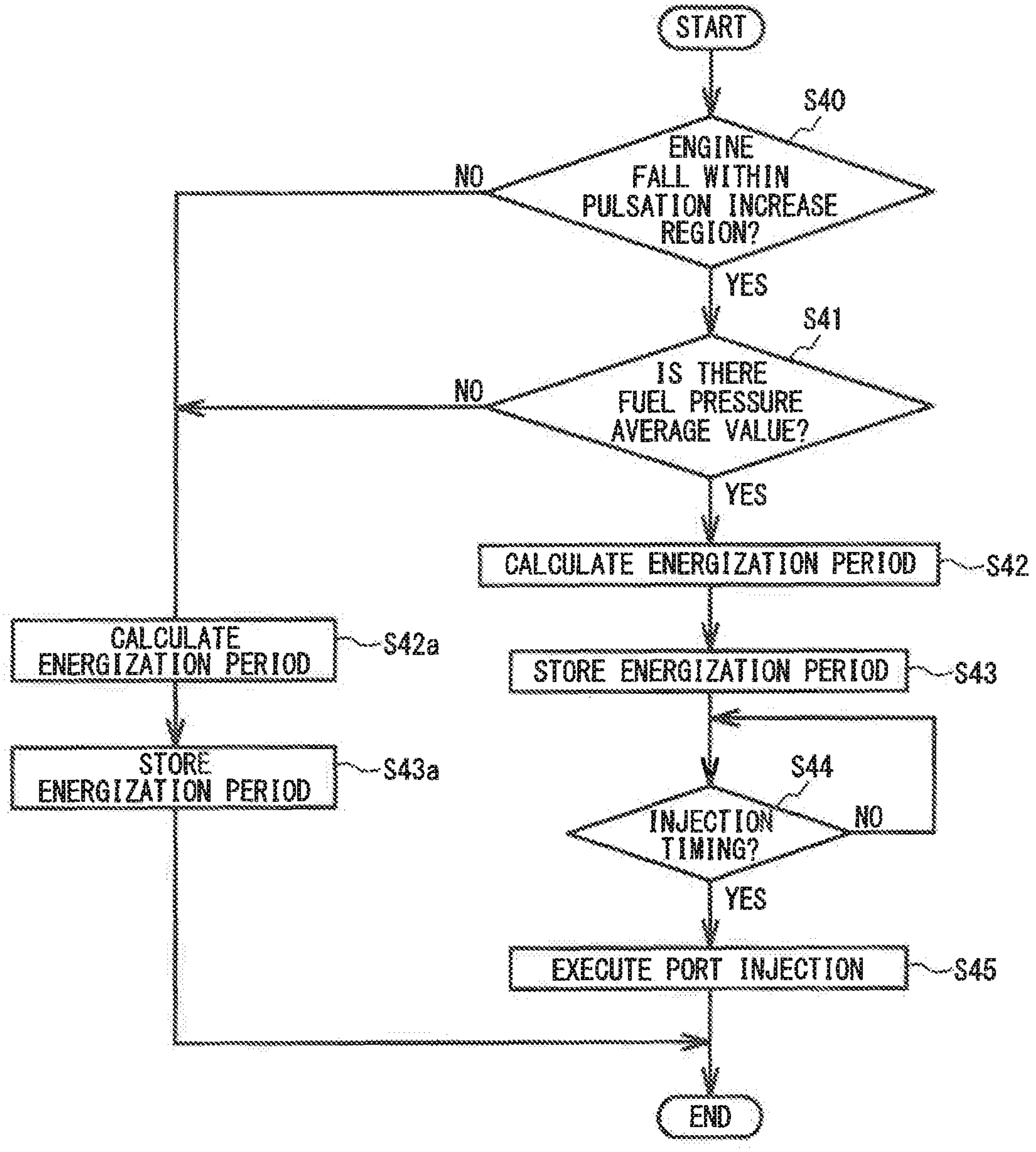
FIG. 14 is a flowchart illustrating an example of port injection execution control executed by an ECU in the sixth variation.

Next, the sixth variation will be described. FIG. 14 is a flowchart illustrating an example of the port injection execution control executed by the ECU 41 in the sixth variation. Additionally, the sixth variation will be described with reference to the configuration illustrated in FIG. 1. In the sixth variation, the ECU 41 variably controls the fuel pressure in the low pressure delivery pipe 26 according to the driving state of the engine 10, more specifically, the load and the rotational speed of the engine 10. That is, the pressure of fuel supplied to the port injection valves 271 to 274 is controlled according to the driving state of the engine 10. Specifically, with reference to a map defining the target fuel pressure in the low pressure delivery pipe 26 according to the driving state of the engine 10, the ECU 41 controls the rotational speed of the feed pump 22 such that the detected value of the fuel pressure sensor 28 reaches the target fuel pressure.

When a negative determination is made in any of steps S40 and S41, the ECU 41 determines the energization period τ of the port injection valve scheduled to next inject fuel on the basis of the detection value of the fuel pressure sensor 28 just before the calculation timing of the energization period τ of the port injection valve Value (step S42*a*). The ECU 41 also updates and stores the detection value of the fuel pressure sensor 28 in the RAM, which stores the latest detected value in the RAM. The calculated energization period τ is stored in the RAM in association with the port injection valve scheduled to next inject fuel (step S43*a*). Then, the process after step S44 is executed. Therefore, when the engine speed does not fall within the pulsation increase range or there is no fuel pressure average value stored in the RAM, even while the fuel pressure in the low pressure delivery pipe 26 is changed according to the driving state of the engine 10, the energizing period τ is calculated based on the fuel pressure value immediately before the energizing period τ is calculated. This accurately controls the fuel injection quantity of the port injection valve.

While the exemplary embodiments of the present invention have been illustrated in detail, the present invention is not limited to the above-mentioned embodiments, and other embodiments, variations and variations may be made without departing from the scope of the present invention.

DESCRIPTION OF LETTERS OR NUMERALS

10 engine (internal combustion engine)
11 cylinders
111 to 114 cylinder
14 crankshaft
14*a* crank angle sensor
15 camshaft
22 feed pump
25 low pressure fuel pipe (low pressure fuel passage)
26 low pressure delivery pipe (low pressure fuel passage)
27 port injection valves
271 to 274 port injection valve
28 fuel pressure sensor
31 high pressure pump
35 high pressure fuel pipe (high pressure fuel passage)
36 high pressure delivery pipe (high pressure fuel passage)
37 cylinder injection valves
371 to 374 cylinder injection valve
41 ECU (controller, determinator, storage, calculator)
CP cam

The invention claimed is:

1. A control device of an internal combustion engine comprising:

cylinder injection valves that respectively inject fuel directly into cylinders of the internal combustion engine;

a first port injection valve and a second port injection valve that respectively inject fuel into a first intake port and a second intake port of the internal combustion engine;

a low pressure pump that supplies pressurized fuel to the first port injection valve and the second port injection valve via a low pressure fuel passage;

a high pressure pump driven in conjunction with a crankshaft of the internal combustion engine, the high pressure pump being configured to further pressurize the fuel supplied from the low pressure pump and supply the further pressurized fuel to the cylinder injection valves via a high pressure fuel passage that branches off from the low pressure fuel passage, wherein the high pressure pump generates at least one cycle of fuel pressure pulsation in the low pressure fuel passage;

a fuel pressure sensor that detects a fuel pressure in the low pressure fuel passage;

a crank angle sensor that detects a rotational angle of the crankshaft of the internal combustion engine; and a controller configured to:

calculate a first energization period of the first port injection valve and a second energization period of the second port injection valve, the first energization period and the second energization period corresponding to a respective required injection quantity, wherein the second energization period of the second port injection valve is based on a stored fuel pressure that was detected in the low pressure fuel passage via the fuel pressure sensor during an injection by the first port injection valve, the stored fuel pressure being updated by the controller whenever the first port injection valve injects fuel;

energize the first port injection valve in a first instance of a predetermined crank angle interval only for the first calculated energization period; and energize the second port injection valve in a second instance of the predetermined crank angle interval only for the second calculated energization period, wherein the second port injection valve is scheduled to inject fuel after the at least one cycle of fuel pressure pulsation elapses after the injection by the first port injection valve.

2. The control device of the internal combustion engine according to claim 1, wherein the fuel pressure sensor detects the fuel pressure at a time interval shorter than a minimum energization period of each of the first port injection valve and the second port injection valve.

3. The control device of the internal combustion engine according to claim 1, wherein the controller is further configured to:

calculate an average value of fuel pressures that are detected during the injection of the first port injection valve, store the average value of fuel pressures, and calculate the second energization period of the second port injection valve based on the stored average value of fuel pressures.

4. The control device of the internal combustion engine according to claim 1, wherein:

the controller includes a determinator configured to determine whether an engine speed falls within a pulsation increase region, the pulsation increase region being a range where a difference between an actual fuel injection quantity and the respective required injection quantity exceeds an allowable range, and when the determinator of the controller determines that the engine speed falls within the pulsation increase region, the controller stores the fuel pressure detected during the injection of the first port injection valve, and calculates the second energization period of the second port injection valve based on the stored fuel pressure.

5. The control device of the internal combustion engine according to claim 4, wherein:

the controller is further configured to control the fuel pressure in the low pressure fuel passage by controlling the low pressure pump according to a driving state of the internal combustion engine, and when it is not determined that the engine speed falls within the pulsation increase region, the controller calculates the second energization period of the second port injection valve based on the fuel pressure that is detected immediately before the second energization period of the second port injection valve is calculated.

6. A control device of an internal combustion engine comprising:

cylinder injection valves that respectively inject fuel directly into cylinders of the internal combustion engine;

a first port injection valve and a second port injection valve that respectively inject fuel into a first intake port and a second intake port of the internal combustion engine;

a low pressure pump that supplies pressurized fuel to the first port injection valve and the second port injection valve via a low pressure fuel passage;

a high pressure pump driven by a cam that is interlocked with a crankshaft of the internal combustion engine, the high pressure pump being configured to further pressurize the fuel supplied from the low pressure pump and supply the further pressurized fuel to the cylinder injection valves via a high pressure fuel passage that branches off from the low pressure fuel passage, wherein the high pressure pump generates at least one cycle of fuel pressure pulsation in the low pressure fuel passage;

a fuel pressure sensor that detects a fuel pressure in the low pressure fuel passage;

a crank angle sensor that detects a rotational angle of the crankshaft of the internal combustion engine; and a controller configured to:

calculate a first energization period of the first port injection valve and a second energization period of the second port injection valve, the first energization period and the second energization period corresponding to a respective required injection quantity, wherein the second energization period of the second port injection valve is based on a stored fuel pressure that was detected in the low pressure fuel passage via the fuel pressure sensor during an injection by the first port injection valve, the stored fuel pressure being updated by the controller whenever the first port injection valve injects fuel;

energize the first port injection valve in a first instance of a predetermined crank angle interval only for the first calculated energization period; and energize the second port injection valve in a second instance of the predetermined crank angle interval only for the second calculated energization period, wherein the second port injection valve is scheduled to inject fuel after the at least one cycle of fuel pressure pulsation elapses after the injection by the first port injection valve.

7. The control device of the internal combustion engine according to claim 6, wherein the fuel pressure sensor detects the fuel pressure at a time interval shorter than a minimum energization period of each of the first port injection valve and the second port injection valve.

8. The control device of the internal combustion engine according to claim 6, wherein the controller is further configured to:

calculate an average value of fuel pressures that are detected during the injection of the first port injection valve, store the average value of fuel pressures, and calculate the second energization period of the second port injection valve based on the stored average value of fuel pressures.

9. The control device of the internal combustion engine according to claim 6, wherein:

the controller includes a determinator configured to determine whether an engine speed falls within a pulsation increase region, the pulsation increase region being a range where a difference between an actual fuel injection quantity and the respective required injection quantity exceeds an allowable range, and when the determinator of the controller determines that the engine speed falls within the pulsation increase region, the controller stores the fuel pressure detected during the injection of the first port injection valve, and calculates the second energization period of the second port injection valve based on the stored fuel pressure.

10. The control device of the internal combustion engine according to claim 9, wherein:

the controller is further configured to control the fuel pressure in the low pressure fuel passage by controlling the low pressure pump according to a driving state of the internal combustion engine, and when it is not determined that the engine speed falls within the pulsation increase region, the controller calculates the second energization period of the second port injection valve based on the fuel pressure that is detected immediately before the second energization period of the second port injection valve is calculated.

11. The control device of the internal combustion engine according to claim 3, wherein:

the controller is configured to calculate the average value of fuel pressures based on fuel pressures detected during the injection of the first port injection valve, among fuel pressures sequentially detected by the fuel pressure sensor, and the controller is configured to update the average value of fuel pressures stored whenever the first port injection valve injects fuel.

12. The control device of the internal combustion engine according to claim 8, wherein:

the controller is configured to calculate the average value of fuel pressures based on fuel pressures detected during the injection of the first port injection valve, among fuel pressures sequentially detected by the fuel pressure sensor, and the controller is configured to update the average value of fuel pressures stored whenever the first port injection valve injects fuel.

* * * * *